United States Patent
Erickson et al.

(10) Patent No.: US 11,500,515 B2
(45) Date of Patent: Nov. 15, 2022

(54) ISSUE TRACKING SYSTEM INTEGRATIONS

(71) Applicants: Atlassian Pty Ltd., Sydney (AU); Atlassian Inc., San Francisco, CA (US)

(72) Inventors: Matthew Nielsen Erickson, Sydney (AU); Adam Paul Ferla, Sydney (AU); Taylor Timothy Pechacek, Sydney (AU); Lenin Raj Rajasekaran, Sydney (AU); Mateus Molinaro Motta, Sydney (AU); Harrison Dempsey, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 177 days.

(21) Appl. No.: 16/917,647

(22) Filed: Jun. 30, 2020

(65) Prior Publication Data
US 2021/0405830 A1  Dec. 30, 2021

(51) Int. Cl.
| | |
|---|---|
| *G06F 8/70* | (2018.01) |
| *G06F 8/77* | (2018.01) |
| *G06F 3/0482* | (2013.01) |
| *G06F 9/451* | (2018.01) |
| *G06F 8/20* | (2018.01) |
| *G06Q 10/10* | (2012.01) |

(Continued)

(52) U.S. Cl.
CPC .............. *G06F 3/0482* (2013.01); *G06F 8/24* (2013.01); *G06F 8/41* (2013.01); *G06F 8/60* (2013.01); *G06F 8/77* (2013.01); *G06F 9/451* (2018.02); *G06Q 10/103* (2013.01)

(58) Field of Classification Search
CPC . G06F 3/0482; G06F 8/24; G06F 8/41; G06F 8/60; G06F 8/77; G06F 9/451; G06Q 10/103
See application file for complete search history.

(56) References Cited

U.S. PATENT DOCUMENTS

| | | | |
|---|---|---|---|
| 7,225,139 B1 * | 5/2007 | Tidwell | G06Q 10/063114 705/7.15 |
| 10,936,462 B1 * | 3/2021 | Eardley | G06F 11/0772 |

(Continued)

*Primary Examiner* — Shirley X Zhang
(74) *Attorney, Agent, or Firm* — Brownstein Hyatt Farber Schreck, LLP

(57) ABSTRACT

Described herein is an issue tracking system (ITS) comprising: one or more processors; one or more non-transitory computer-readable storage media storing sequences of instructions which, when executed by the one or more processors, cause the one or more processors to: render a user interface including a plurality of user interface elements each listing an external service from which the ITS can receive external objects and associate the received external object with one or more issues maintained by the ITS; determine, in response to a user interaction with one of the user interface elements, whether an issue maintained by the ITS is associated with an external object received from the listed external service; and render within the ITS, a user interface for an application marketplace, the application marketplace user interface including a listing of one or more integration applications that, once installed, connect the listed external service to the ITS and associate external objects received from the listed external service with one or more issues maintained by the ITS.

18 Claims, 11 Drawing Sheets

(51) Int. Cl.
    *G06F 8/60*     (2018.01)
    *G06F 8/41*     (2018.01)

(56) References Cited

U.S. PATENT DOCUMENTS

| | | | |
|---|---|---|---|
| 2013/0074038 A1* | 3/2013 | Fox | G06F 8/71 |
| | | | 717/122 |
| 2019/0205542 A1* | 7/2019 | Kao | G06F 8/70 |
| 2020/0159525 A1* | 5/2020 | Bhalla | G06F 21/563 |
| 2021/0304142 A1* | 9/2021 | Bar-on | G06Q 10/101 |

* cited by examiner

ISSUE TRACKING SYSTEM INTEGRATIONS

TECHNICAL FIELD

The present disclosure is directed to issue tracking systems and methods. In particular, the present disclosure is directed to systems and methods for integrating issue tracking systems with external services.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Software developers may utilize various tracking and project management software services in order to manage variety of software development related tasks and projects. Once an application or software is deployed, an additional suite of other software services may be used in order to monitor the use or performance of the deployed application or software. Traditionally, issue tracking services do not effectively interface with downstream performance monitoring services. The systems and techniques described herein are directed to technical integrations between a variety of services, which may improve the efficiency and effectiveness of the platform.

SUMMARY

Example embodiments described herein are directed to computer-implemented methods and issue tracking systems (ITS). The ITS renders on a user device, a user interface that includes a plurality of user interface elements each listing an external service from which the ITS can receive an external object and associate the received external object with one or more issues maintained by the ITS. The ITS determines, in response to a user interaction with one of the user interface elements, whether an issue maintained by the ITS is associated with an external object received from the listed external service and renders an application marketplace that includes a listing of one or more integration applications that, once installed, connect the listed external service to the ITS and associate external objects received from the listed external service with one or more issues maintained by the ITS.

Some example embodiments are directed to a computer-implemented method. The method may include rendering, by an issue tracking system (ITS). The user interface may include a plurality of user interface elements each listing an external service from which the ITS can receive an external object and associate the received external object with one or more issues maintained by the ITS. The ITS may determine, in response to a user interaction with one of the user interface elements, whether an issue maintained by the ITS is associated with an external object received from the listed external service. A user interface for an application marketplace may be rendered within the ITS (application marketplace user interface). The application marketplace user interface may include a listing of one or more integration applications that, once installed, connect the listed external service to the ITS and associate external objects received from the listed external service with one or more issues maintained by the ITS.

Some example embodiments are directed to an issue tracking system (ITS) comprising: one or more processors and one or more non-transitory computer-readable storage media storing sequences of instructions which, when executed by the one or more processors, cause the one or more processors to perform various operations. The operations may include rendering a user interface including a plurality of user interface elements each listing an external service from which the ITS can receive an external object and associate the received external object with one or more issues maintained by the ITS. The operations may also include determining, in response to a user interaction with one of the user interface elements, whether an issue maintained by the ITS is associated with an external object received from the listed external service. An application marketplace user interface may be rendered within the ITS. The application marketplace user interface may include a listing of one or more integration applications that, once installed, connect the listed external service to the ITS and associate external objects received from the listed external service with one or more issues maintained by the ITS.

Figure 1:
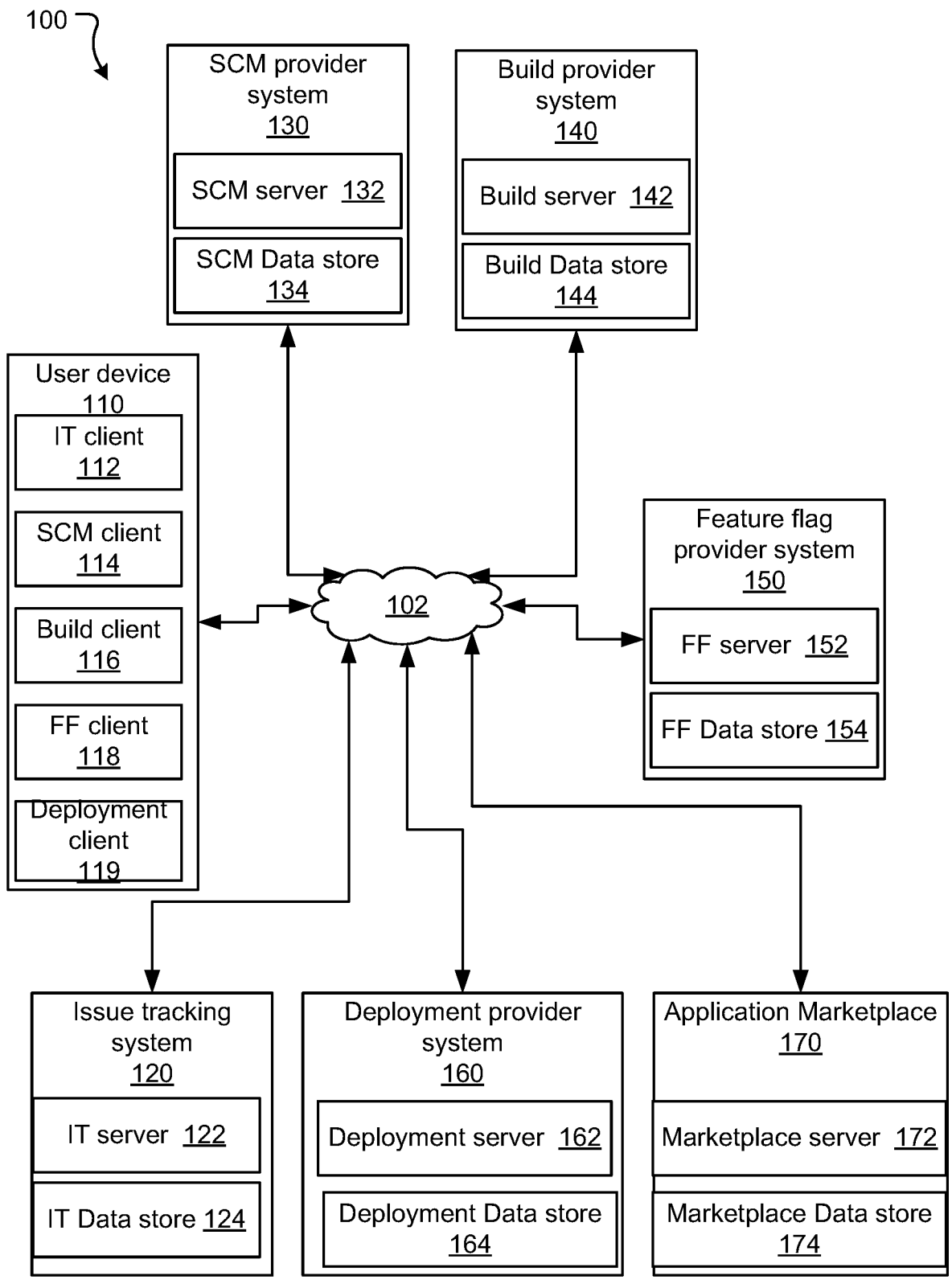
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

An issue tracking (IT) system (such as Applicant's "Jira"® suite of products) is application software that can be used to manage a wide range of tasks and projects. IT systems find particular application in managing software development projects. In this regard, an IT system allows the many and varied aspects of a software development project to be tracked and scheduled. For example, IT systems can be used to track to bugs, and to schedule builds and deployments. For software development, IT systems are typically used in conjunction with other specialized tools that are used to develop, integrate, deliver and deploy software products. Yet more tools are used to monitor the use of software products once deployed.

'DevOps' is a software development methodology that stresses communication and collaboration between software developers and other information-technology professionals (especially those responsible for information-technology operations). DevOps acknowledges the interdependence of software development, quality assurance, and information-technology operations, and aims to accelerate development and deployment cycles while maintaining the reliability and security of the software products and services produced.

Integrating the tools and services used for software development and monitoring, with an IT system, is consistent with the DevOps methodology of greater collaboration between software developers and information-technology operations. However, current approaches to effecting such integrations are somewhat deficient due to their complexity.

Generally speaking, the basic unit of information in an IT system is an "issue". As such, when an IT system is used to manage a software development project, the attributes of the project being managed are mapped to IT system issues. For example, development teams create projects in an IT system that correspond to software products (e.g. project A corresponds to software product A). A person who comes up with an idea for a new feature for software product A (feature A) may then create an issue (or set of related issues) for the feature and associate the issue with project A. As development of feature A progresses (e.g. planned, developed, built, tested, released, enabled, marketed, supported, etc.), the feature A issue transitions through various workflow states with information being added to the issue by the relevant stakeholders.

As described above, a variety of software products and services are used to develop, test and release software, and monitor the use of software once released. These include, for example, source code management (SCM) systems (also known as 'revision control' or 'version control systems'), build systems, deployment systems, automation systems, integration systems and feature flag systems. As used herein the term "external service" refers to software products and services (such as those used to develop, release and monitor software) that are separate to an IT system.

While IT systems can been integrated with external services used in the software development/deployment lifecycle, the integration process can be complex and cumbersome. Moreover, while there are tools available to accomplish the task of integration, the takeup of such tools is limited.

The embodiments described herein involve improvements to IT systems that result in making integration tools and applications more available to the user. Some embodiments provide IT systems with enhanced graphical user interfaces and backend processing that combine to deliver integration tools and applications to the user.

An overview of one example environment illustrating different systems involved in certain embodiments will be described, followed by a description of a computer system which can be configured in various ways to perform the embodiments/various features thereof as described herein.

FIG. 1 illustrates an example environment 100 in which embodiments and features of the present disclosure are implemented. Example environment 100 includes a communications network 102 which interconnects a user device 110 with an IT system 120, an SCM provider system 130, a Build provider system 140, a Feature flag (FF) provider system 150, a Deployment provider system 160 and an Application marketplace system 170.

User device 110 is a computer processing system with an IT client application 112, an SCM client application 114, a Build client application 116, an FF client application 118 and a Deployment client application 119 installed thereon. User device 110 will also have other applications installed/running thereon, for example an operating system.

When executed by the user device 110 (e.g. by a processor such as processor 204 described below), the IT client application 112 configures the user device 110 to provide client-side IT system functionality. This involves communicating (using a communication interface such as 218 described below) with the IT server system 120 (and, in particular, the IT server 122). IT client 112 may be a dedicated application client that communicates with an IT application server using an API. Alternatively, IT client 112 may be a web browser (such as Chrome, Safari, Internet Explorer, Firefox, or an alternative web browser) which communicates with an IT web server using http/https protocols.

When executed by the user device 110 (e.g. by a processor such as processor 204), the SCM client application 114 configures the user device 110 to provide client-side SCM system functionality. This involves communicating with the SCM provider system 130 (and, in particular, the SCM server 132). Examples of SCM provider systems include GitHub and Bitbucket (commercially available from Atlassian Pty Ltd). Generally speaking, SCM systems store data—typically source code—in repositories maintained on SCM server 132 and facilitate access to that data from multiple different client systems. In order to work on a project, a user (using a client system) creates a local copy of the relevant data (e.g. program source code) from a repository and works on that local copy. If the user makes changes that are to be incorporated into the remote version of the data, the user's local copy of the data—or at least those portions that have been changed—is written back to the repository using the SCM system. The SCM system controls access to the repository data and also manages version control for the data SCM client application 114 may be a dedicated application client that communicates with an SCM application server using an API. Alternatively, SCM client 114 may be a web browser which communicates with a FF web server using http/https protocols.

When executed by the user device 110 (e.g. by a processor such as processor 204), the Build client application 116 configures the user device 110 to provide client-side build system functionality. This involves communicating with the Build provider system 140 (and, in particular, the Build server 142). Build client 116 may be a dedicated application client that communicates with a Build application server using an API. Alternatively, Build client 116 may be a web browser which communicates with a Build web server using http/https protocols.

Build provider system 140 provides any number of tools and services that are used to build, test and deploy software. Build provider system 140 also provides tools and services that automate the building, testing and deployment processes, thus facilitating continuous integration and continuous delivery practices.

Examples of Build provider systems include Bitbucket Pipelines, Jenkins, TeamCity, CircleCI and Travis CI.

When executed by the user device 110 (e.g. by a processor such as processor 204), the FF client application 118 configures the user device 110 to provide client-side FF system functionality. This involves communicating with the FF provider system 150 (and, in particular, the FF server 152). FF client 118 may be a dedicated application client that communicates with a FF application server using an API. Alternatively, FF client 118 may be a web browser which communicates with a FF web server using http/https protocols.

FF provider system 150 provides tools and services that implement feature flag development techniques. Such techniques provide an alternative to maintaining multiple feature branches in source code, allowing software features to be tested even before they are completed and ready for release. The techniques allow developers to release a version of a product that has unfinished features, by hiding those features so they do not appear, for example in the user interface. This allows multiple incremental versions of software to be delivered without the costs associated with extensive branching and merging.

Examples of FF provider systems include LaunchDarkly, Rollout and Optimizely.

When executed by the user device 110 (e.g. by a processor such as processor 204), the Deployment client application 119 configures the user device 110 to provide client-side deployment system functionality. This involves communicating with the Deployment provider system 160 (and, in particular, the Deployment server 162). Deployment client 119 may be a dedicated application client that communicates with a Deployment application server using an API. Alternatively, Deployment client 119 may be a web browser which communicates with a Deployment web server using http/https protocols.

Deployment provider system 160 provides any number of tools and services that are used to deploy software. In some cases, the tools and services provided by Deployment provider system 160 overlap with those provided by the Build system provider 140. For example, Bitbucket Pipelines, Jenkins, TeamCity and CircleCI can function as Deployment provider systems 160. Further examples of Deployment provider systems 160 include Azure Pipelines and Octopus Deploy.

Application marketplace system 170 is an online distribution platform for application programs and other software objects such as plugins, libraries, APIs and the like. Application marketplace system 170 maintains suitable marketplace servers 172 and marketplace data stores 172 to host the applications and objects available for download therefrom. The underlying details of Application marketplaces are not required for an understanding of the present disclosure and will therefore not be further exemplified. An example of an Application marketplace is "Atlassian Marketplace" provided by the Applicant.

While user device 110 has been shown with separate IT, SCM, Build, FF and Deployment clients 112, 114, 116 and 118, a single application may be used as two or more of the client applications (e.g. a web browser, in which case the corresponding servers 122, 132, 142 and 152 are web servers).

User device 110 may be any form of computing device. Typically, user device 110 will be a personal computing device—e.g. a desktop computer, laptop computer, tablet computer, and in some instances a mobile phone. While a single user device 110 has been illustrated, an environment would typically include multiple user devices 110 interacting with the IT system 120, SCM provider system 130, Build provider system 140, FF provider system 160 and/or Deployment provider system 160.

IT system 120 includes an IT server 122 and an IT data store 124. The IT server 122 configures the IT system 120 to provide server side IT system functionality—e.g. by receiving and responding to requests from IT clients (e.g. client 112), storing/retrieving data from the IT data store 124.

IT server 122 may be a web server (for interacting with web browser clients) or an application server (for interacting with dedicated application clients). While IT server system 120 has been illustrated with a single server 122 it may provide multiple servers (e.g. one or more web servers and/or one or more application servers).

In certain embodiments, IT system 120 is a scalable system including multiple distributed server nodes connected to the shared data store 124 (e.g. a shared file server). Depending on demand from clients (and/or other performance requirements), IT system 120 server nodes can be provisioned/de-provisioned on demand to increase/decrease the number of servers offered by the IT system 120. Each IT server 122 may run on a separate computer system and include one or more application programs, libraries, APIs or other software that implement server-side functionality. Similarly, IT data store 124 may run on the same computer system as an IT server 122, or may run on its own dedicated system (accessible to IT server(s) 122 either directly or via a communications network).

The IT server 122 (running on IT server system 120) and IT client 112 (running on user device 110) operate together to provide an IT system/IT system functionality. Operations described herein as IT operations or operations being performed by the IT system may be performed by the IT client 112 (operating on user device 110), the IT server 122 (operating on IT server system 120) or the IT client 112 and IT server 122 in cooperation. For example, IT operations involving the display of user information involve displaying information on the user device 110 (e.g. on a display such as 212) as controlled by the IT client 112. The data displayed, however, may be generated by the IT client 112 itself, or generated by the IT server 122 and communicated to the IT client 112 therefrom. As a further example, IT operations involving user input involve the user device 110 receiving user input (e.g. at input device 214) and passing that input to the IT client 112. The information input may be processed by the IT client 112 itself, or communicated by the IT client 112 to the IT server 122 to be processed by the IT server 122. IT operations involving writing data to the IT data store 124 involve the IT server 122. The data written to the IT data store 124 may, however, be communicated to the IT server 122 by the IT client 112 (or by another system, e.g. the FF system 130 or CID system 140).

SCM provider system 130, Build provider system 140, FF provider system 150 and Deployment provider system 160 each include respective servers 132, 142, 152 and 162, and data stores 134, 144, 154 and 164 The servers 132, 142, 152 and 162 respectively configure the provider systems 130, 140, 150 and 160 to provide server side system functionality—e.g. by receiving and responding to requests from corresponding clients (e.g. clients 114, 116, 118 and 119) and storing/retrieving data from respective data stores 134 144, 154 and 164.

Servers 132, 142, 152 and 162 may each be a web server (for interacting with web browser clients) or an application server (for interacting with dedicated application clients). While provider systems 130, 140, 150 and 160 have each been illustrated with a single server 132, 142, 152 and 162 respectively, each may include multiple servers (e.g. one or more web servers and/or one or more application servers).

In certain embodiments, one or more of the provider systems 130, 140, 150 and 160 are scalable systems that include multiple distributed server nodes connected to the respective shared data stores 134, 144, 154 and 164 (e.g. a shared file server). Depending on demand from clients (and/or other performance requirements), server nodes can be provisioned/de-provisioned on demand to increase/decrease the number of servers offered by the provider systems 130, 140, 150 and 160. Each server 132, 142, 152 and 162 may run on a separate computer system and include one or more application programs, libraries, APIs or other software that implement server-side functionality. Similarly, each data store 134, 144, 154 and 164 may run on the same computer system as a respective server 132, 142, 152 and 162, or may run on its own dedicated system (accessible to a server(s) either directly or via a communications network 102.

Communications between the various systems in environment 100 are via the communications network 102. Communications network may be a local area network, public network (e.g. the Internet), or a combination of both.

While environment 100 has been provided as an example, alternative system environments/architectures are possible.

The embodiments and features described herein are implemented by one or more special-purpose computing systems or devices. For example, in environment 100 each of the user device 110, IT system 120, SCM provider system 130, Build provider system 140, FF provider system 150 and Deployment system 160 is or includes a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
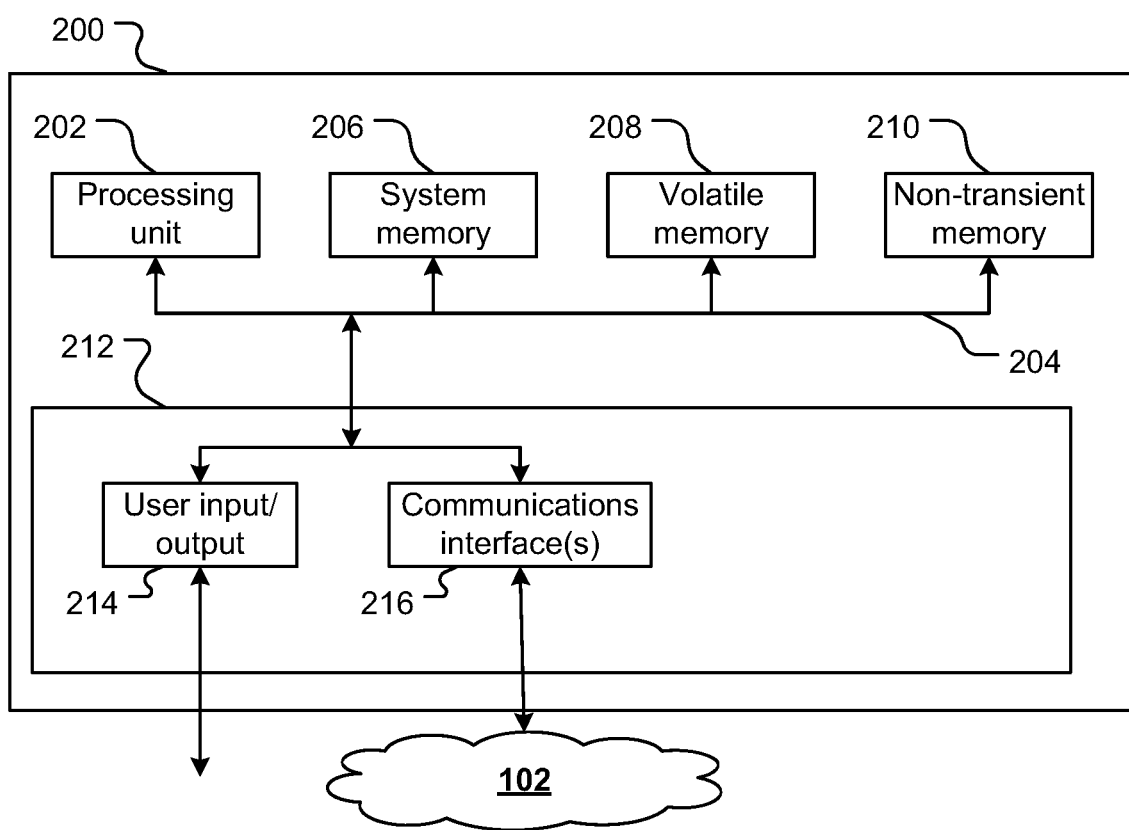
FIG. 2 is a block diagram of a computing system with which various embodiments of the present disclosure may be implemented.

By way of example, FIG. 2 provides a block diagram that illustrates one example of a computer system 200 which may be configured to implement the embodiments and features described herein. Computer system 200 includes a bus 202 or other communication mechanism for communicating information, and a hardware processor 204 coupled with bus 202 for processing information. Hardware processor 204 may be, for example, a general purpose microprocessor, a graphical processing unit, or other processing unit.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 101, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to one embodiment, the techniques herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 108, network link 220 and communication interface 218.

As noted, computer system 200 may be configured in a plurality of useful arrangements, and while the general architecture of system 200 may be the same regardless of arrangements there will be differences. For example, where computer system 200 is configured as a server computer (e.g. such as IT server system 120, FF server system 130, or CID system 140), it will typically be provided with higher end hardware allowing it to process data, access memory, and perform network communications more rapidly than, for example, a user device (such device 110).

This section describes the integration of issue tracking systems with external services.

Generally speaking, embodiments described in this section provide functionality for users to associate IT system 120 issues with external objects (namely objects that are the subject of an external service). In certain embodiments this allows information about associated external objects to be provided to the user directly by the IT system 120 (e.g. in a user interface thereof).

Figure 3:
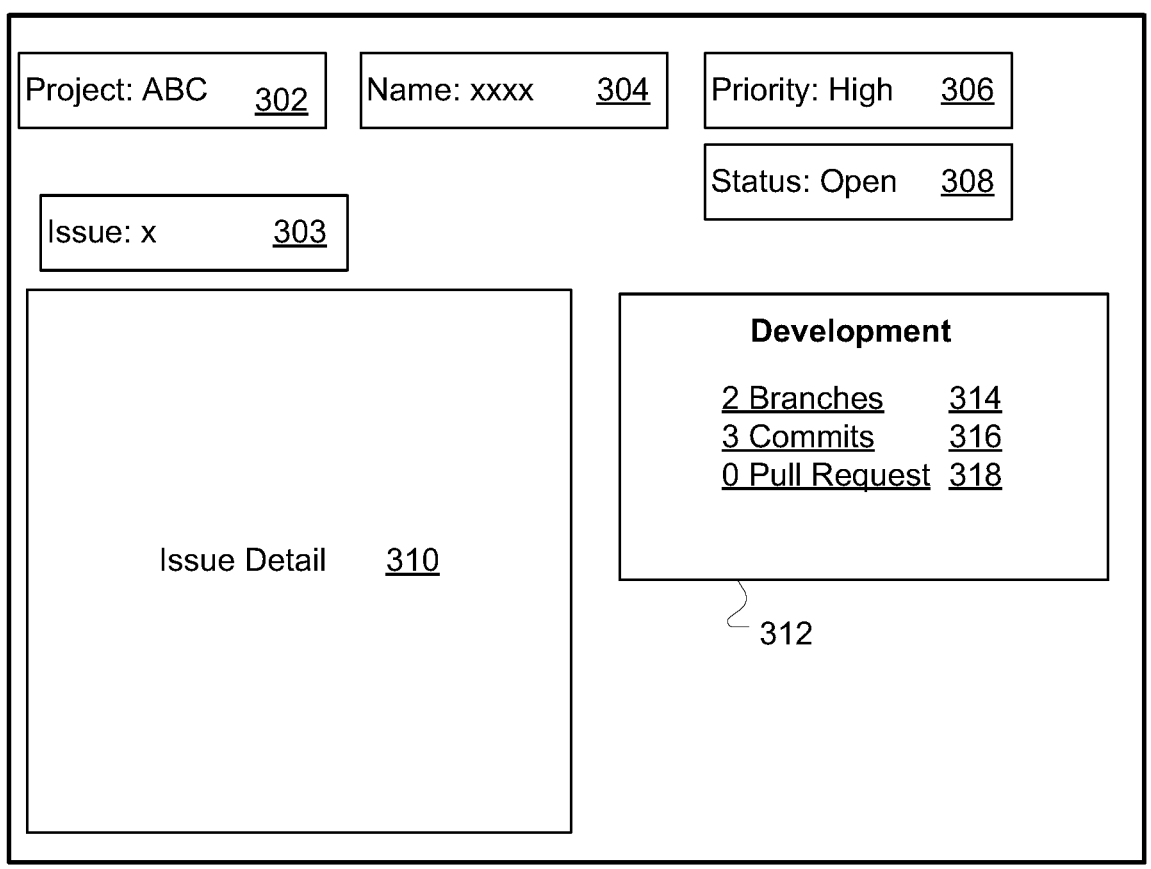
FIG. 3 is an example IT system user interface depicting an issue detail.

FIG. 3 illustrates a user interface 300 rendered by an IT system 120 (in the illustrated embodiment being Jira Software) and displayed on IT client 112 of user device 110. User interface 300 depicts the details of an issue created by a user of IT system 120. Any issues created by users are stored on IT data store 124 to be managed by IT system 120. In the illustrated embodiment, the issue relates to an aspect of a software development project being managed by IT system 120. User interface 300 includes user interface elements 302 and 303 that respectively identify the project (namely Project "ABC") and issue (namely Issue 'X'). User interface 300 further includes a user interface element 304 that identifies the user who either created the issue or to whom the issue has been assigned for actioning. The current priority (namely 'High') and status (namely 'Open') assigned to the issue are displayed in respective user interface elements 306 and 308. The user can enter notes about the issue into text box 310.

In the illustrated embodiment, IT system 120 is configured to communicate with and receive information from one or more external services, such as the services provided by SCM provider system 130, Build provider system 140, FF provider system 150 or Deployment system 160. The precise way in which this is done will depend on the IT system 120 and external system 130, 140, 150 or 160 in question, and the manner in which communication between the systems is to be achieved. Generally speaking, integration between IT system 120 and an external system 130, 140, 150 or 160 is achieved by manually configuring each system or by running an integration tool that automates the integration process.

Once the IT system 120 and external system 130, 140, 150 or 160 have been integrated, the user is free to associate issues maintained by the IT system 120 with the objects that are managed by the external system 130, 140, 150 or 160. In the illustrated embodiment, the integration of IT system 120 and an external system (in this case the SCM provider system 130) is reflected by the presence of a development panel 312 in user interface 300. Development panel 312 includes SCM user interface elements for the SCM objects that are associated with the particular issue. In the illustrated embodiment, development panel 312 includes a branch element 314, commit element 316 and pull request element 318, each of which list the number of SCM objects (namely branches, commits and pull requests) present in the project.

In the illustrated embodiment the development panel 312 reflects the fact that the IT system 120 is integrated with an SCM provider system. Where the IT system 120 is integrated with a different external system, the panel (or other user interface element) includes user interface elements for the objects of that external system that are associated with issues of the IT system 120.

IT system 120 displays development panel 312 in user interface 300 when the user first associates an external object with an issue of the IT system 120. For example, IT system 120 displays development panel 312 after it detects that the user has associated a commit, pull request or deployment with an issue of the IT system 120. If the user has not associated any external objects with an issue, IT system 120 displays a default user interface on IT client 112 of user device 110.

In some embodiments, the default user interface includes functionality inviting the user to perform an initial external object/issue association. For example, the default user interface can include functionality that allows the user to create an SCM object such as a branch, pull request or commit Upon the IT system 120 and SCM provider system 130 creating the SCM object and associating it with an issue, the IT system 120 renders, on IT client 112 of user device 110, the user interface 300 that includes the development panel 312.

Figure 4:
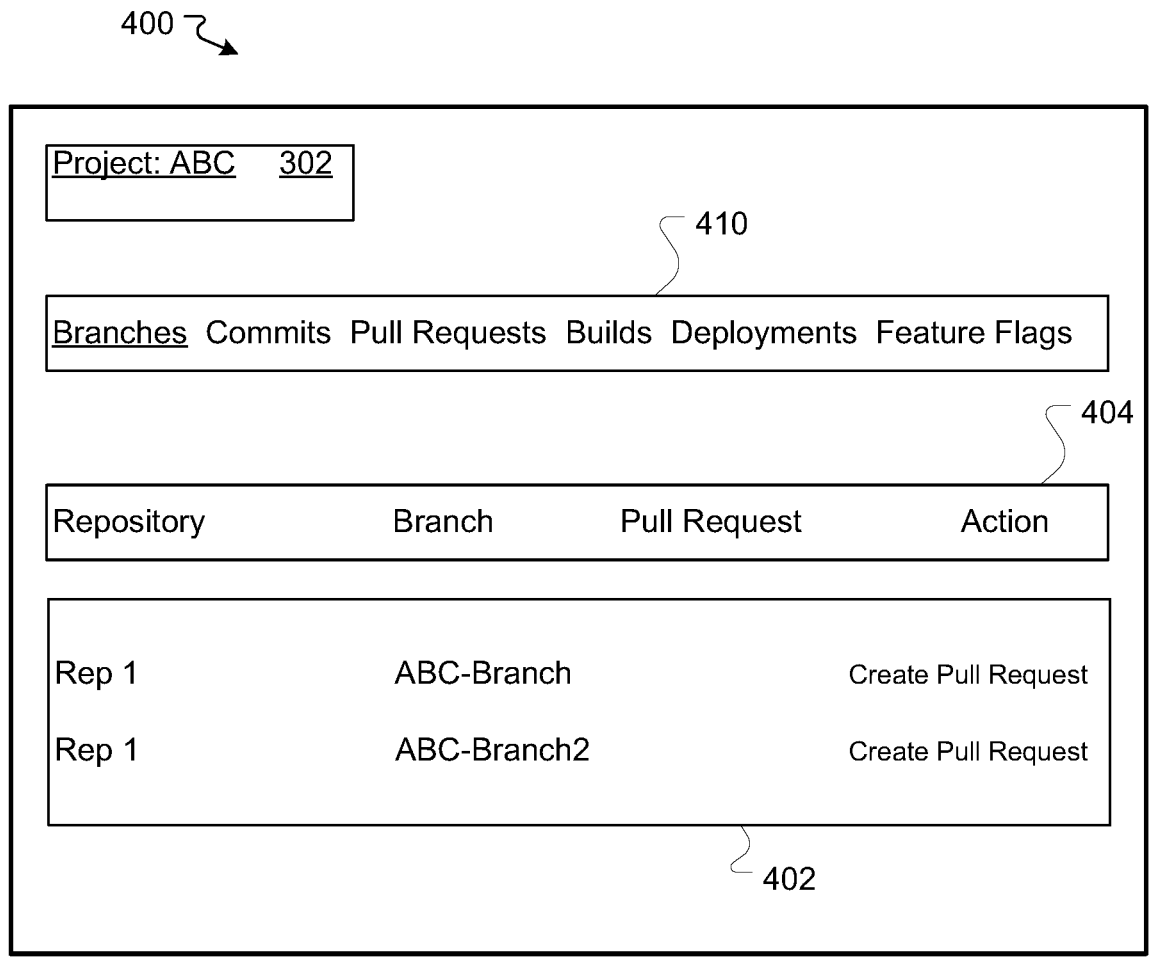
FIG. 4 is a first example IT system user interface depicting an integration between the IT system and an external GIT provider.

The user can obtain further detail about an SCM object by clicking (or providing user input by other means) on one of the SCM user interface elements. FIG. 4 illustrates the user interface 400 rendered by IT system 120 after the user clicks on branch element 314. User interface 400 includes a table 402 that lists pertinent details of the branches, namely the name of the repository in the SCM provider system to which the branch relates, the name of the branch and an indication of whether the branch has any open pull requests. Table 402 also includes action buttons 404 that can be activated by the user to perform an action with respect to a branch (such as create a pull request).

Figure 5:
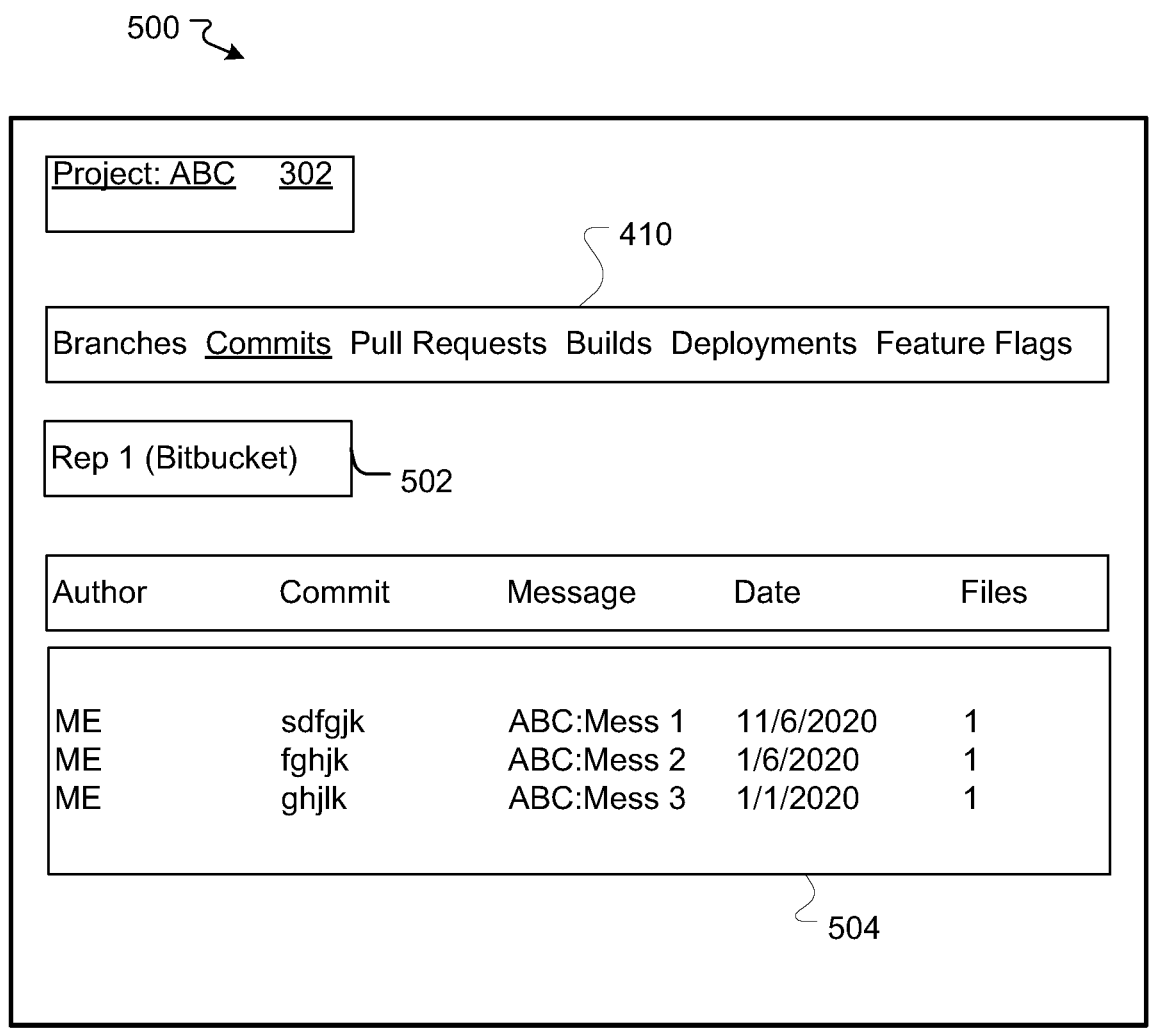
FIG. 5 is a second example IT system user interface depicting an integration between the IT system and an external GIT provider.

FIG. 5 illustrates the user interface 500 rendered by IT system 120 on IT client 112, after the user clicks on commit element 314. User interface 500 includes a window 502 listing the name of the repository to which the commits relate and the name of the SCM provider system 130 hosting the repository (in this case Bitbucket). User interface 500 also includes a table 504 that lists pertinent details of the commits, namely the commit's author, a hash of the commit itself, a message attached to the commit, the date of the commit and the number of files that the commit comprises.

Figure 6:
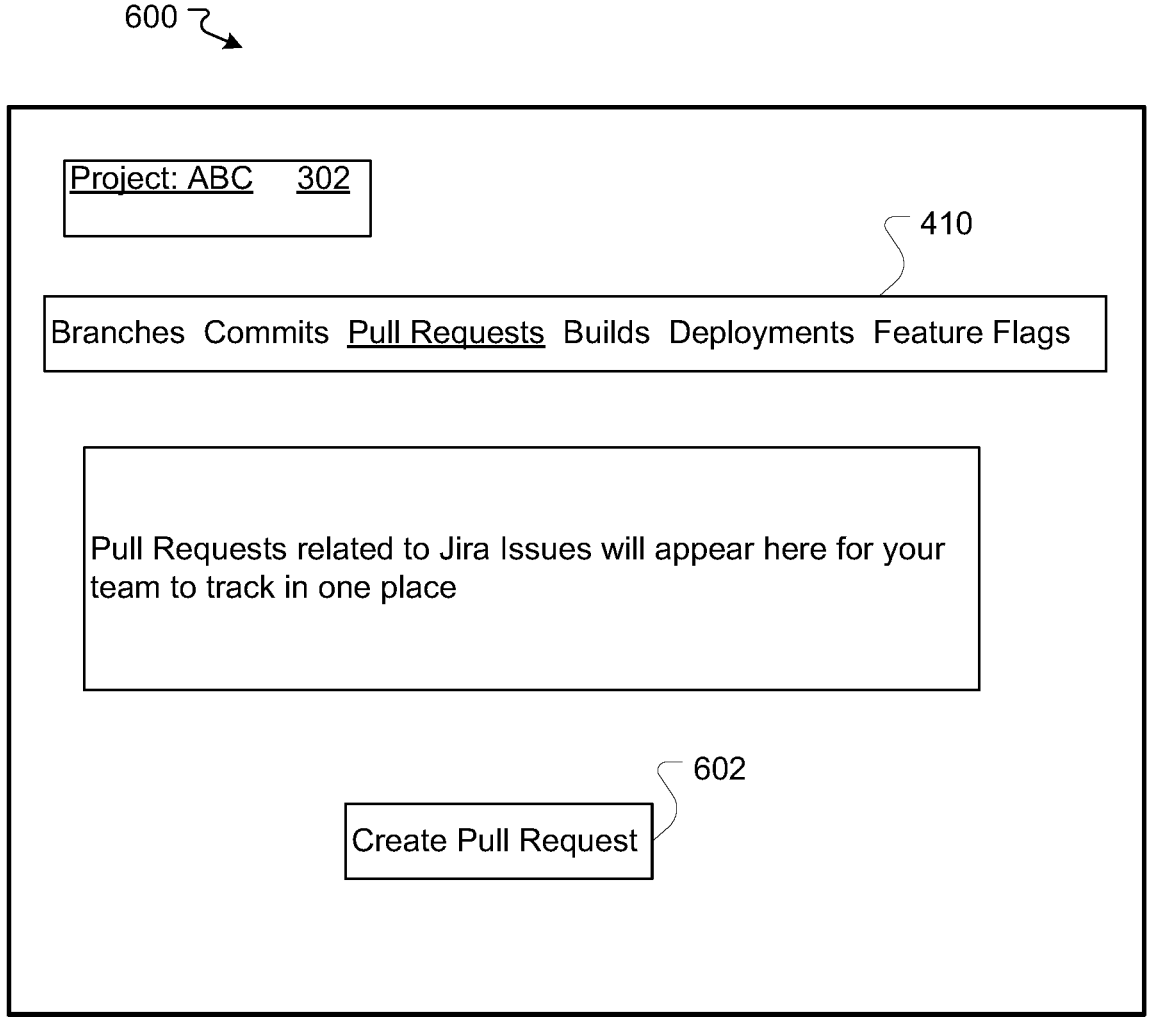
FIG. 6 is a third example IT system user interface depicting an integration between the IT system and an external GIT provider.

FIG. 6 illustrates the user interface 600 rendered by IT system 120 on IT client 112 after the user clicks on pull request element 314. User interface 600 differs from user interfaces 400 and 500 because the user has not yet linked any pull requests to an IT system issue. At the same time, as the IT system 120 and SCM provider system 130 are connected, the user is able to create from within the IT system 120, pull requests and link those pull requests to issues. User interface 600 includes functionality for doing so in the form of a pull request creation button 602.

User interfaces 400, 500 and 600 each include an external service menu bar 410. Each element of external service menu bar 410 lists an external service that the IT system 120 is either already connected to (for example in the illustrated embodiment, branches, commits and pull requests) or could be connected to. In the illustrated embodiments, external service menu bar includes a Branches element, Commit element, Pull Request element, Builds element, Deployments element and Feature Flags element.

For external services to which the IT system 120 is already connected, external service menu bar 410 is displayed in the user interface (with the relevant external service underlined or otherwise highlighted) which details the objects that are the subject of the external service (for example branches in user interface 400, commits in user interface 500 and pull request in user interface 600).

The user can click (or enter user input by other means) on a selected element of the external service menu bar 410 and the SCM system 120 renders the appropriate user interface on the user device 110.

Figure 7:
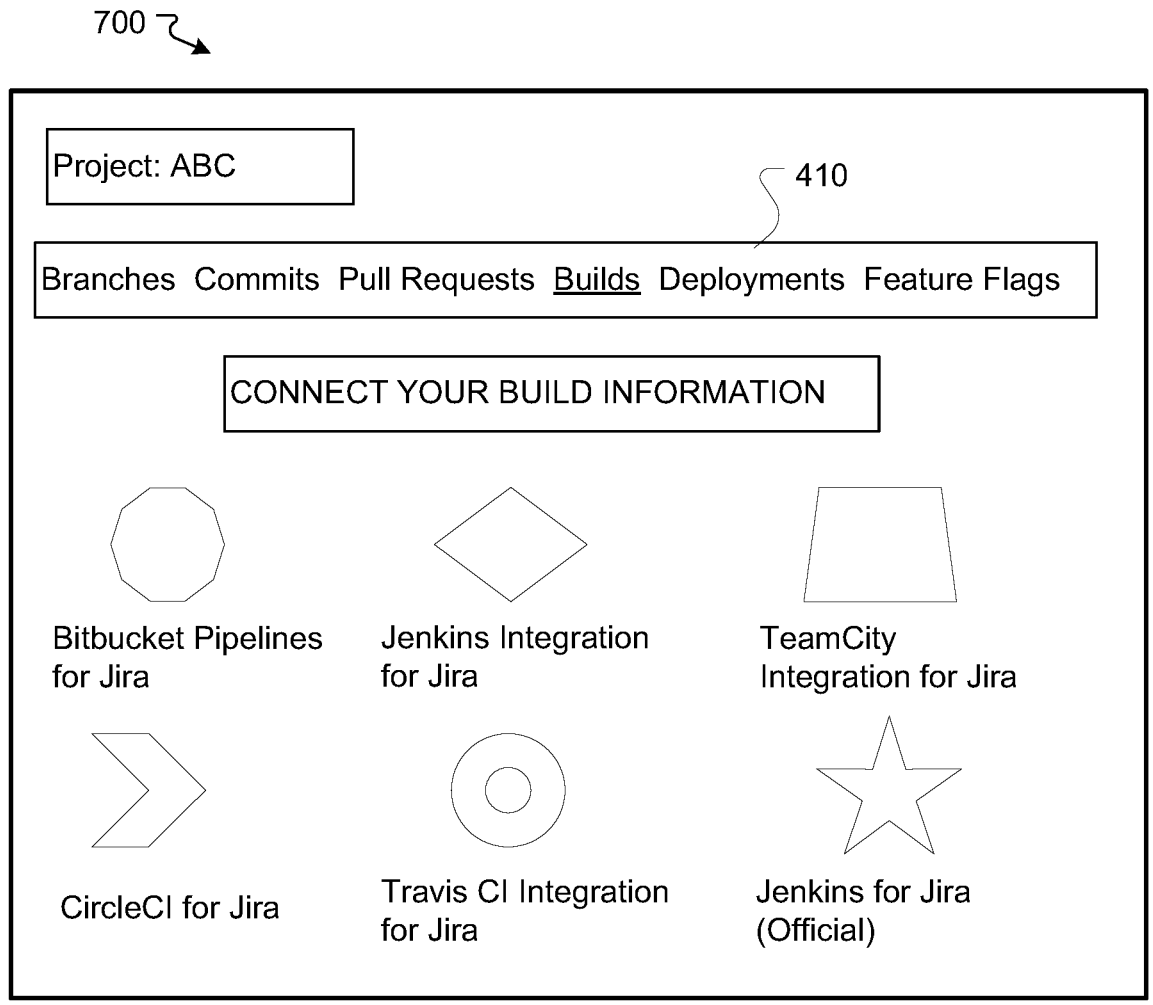
FIG. 7 is an example IT system embedded marketplace user interface listing tools to connect the IT system with an external Build provider.
Figure 8:
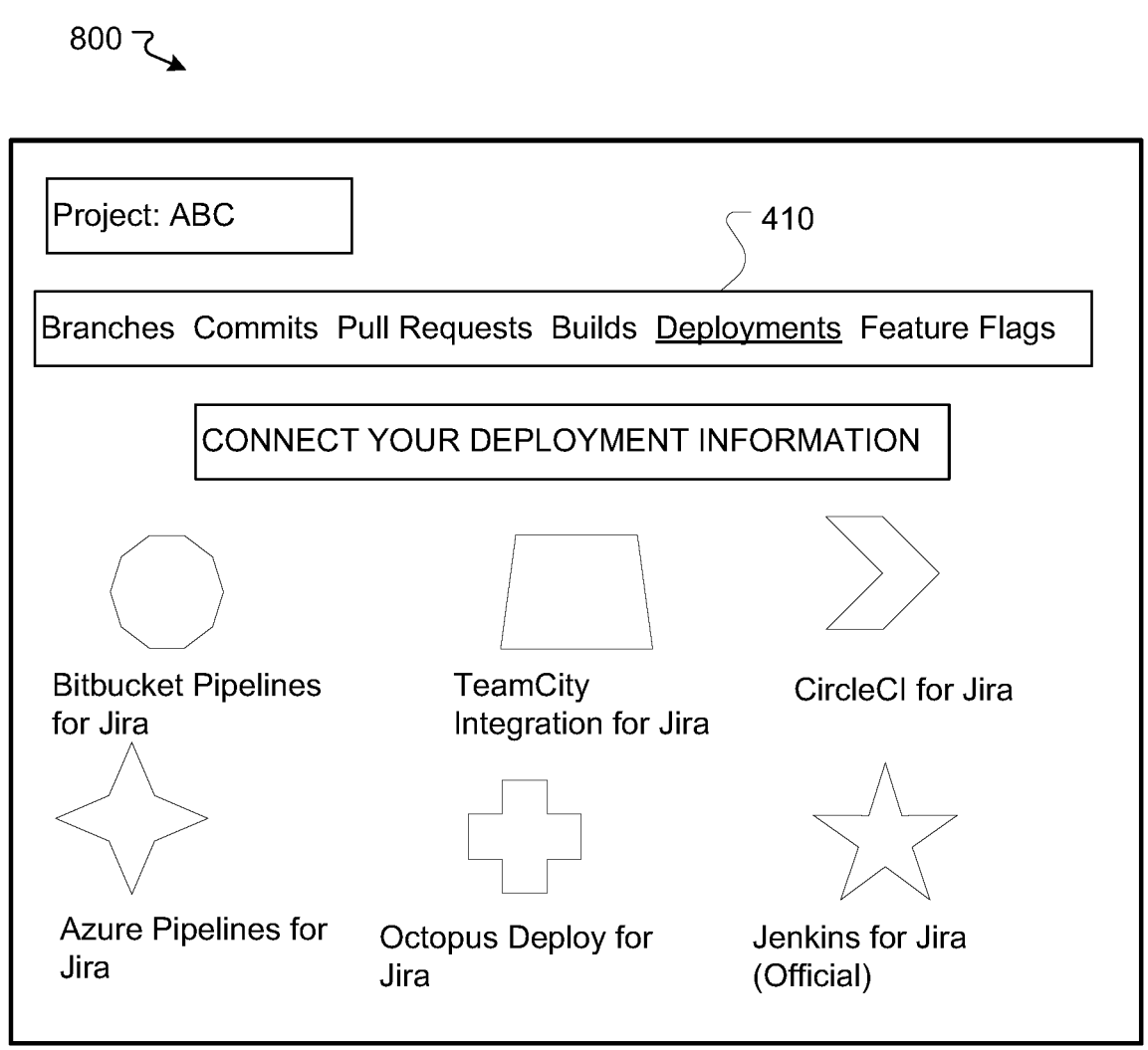
FIG. 8 is an example IT system embedded marketplace user interface listing tools to connect the IT system with an external Deployments provider.
Figure 9:
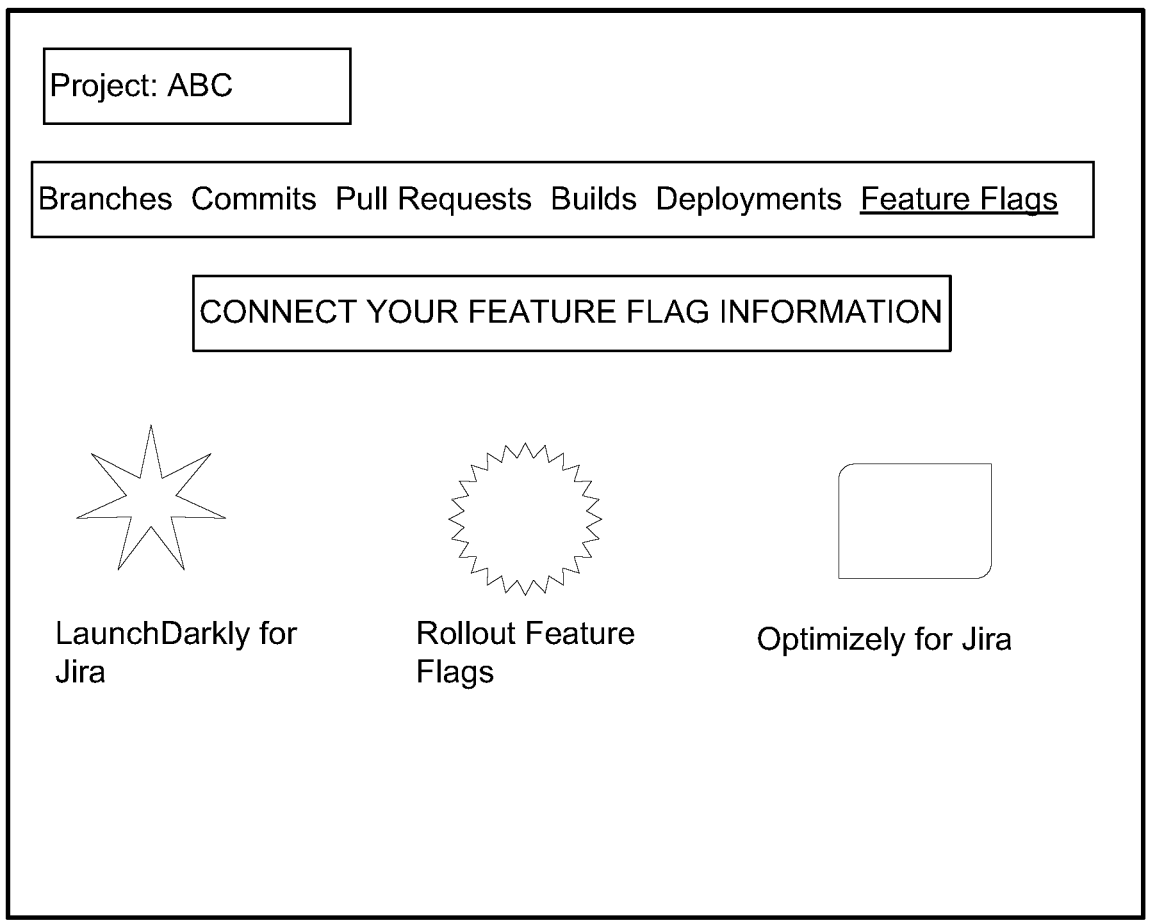
FIG. 9 is an example IT system embedded marketplace user interface listing tools to connect the IT system with an external Feature Flags provider.

FIGS. 7, 8 and 9 illustrate examples of user interfaces that the IT system 120 renders on IT client 112 when the user selects an element of the external service bar 410 that lists an external service to which the IT system 120 is not connected.

FIG. 7 illustrates the user interface 700 that the IT system 120 renders when the user selects the Builds element of the external service menu bar 410. User interface 700 is rendered within the IT system 120, but nevertheless includes details of applications that are available for download from the Application marketplace 170. In the illustrated embodiment, user interface 700 lists the following applications: Bitbucket Pipleines for Jira, Jenkins Integration for Jira, TeamCity Integration for Jira, Circle CI for Jira, Travis Integration for Jira and Jenkins for Jira (Official). These applications can be characterised as integration tools that allow the user to connect build information to the IT system 120 (in this case Jira Software).

External service menu bar 410 is displayed in user interface 700 with the Build element underlined (or otherwise highlighted).

FIG. 8 illustrates the user interface 800 that the IT system 120 renders when the user selects the Deployments element of the external service menu bar 410. User interface 800 is also rendered within the IT system 120, and includes details of applications that are available for download from the Application marketplace 170. In the illustrated embodiment, user interface 800 lists the following applications: Bitbucket Pipleines for Jira, TeamCity Integration for Jira, Circle CI for Jira, Azure Pipelines for Jira, Octopus Deploy for Jira and Jenkins for Jira (Official). These applications can be characterised as integration tools that allow the user to connect deployment information to the IT system 120 (in this case Jira Software).

External service menu bar 410 is displayed in user interface 800 with the Deployment element underlined (or otherwise highlighted).

FIG. 9 illustrates the user interface 900 that the IT system 120 renders when the user selects the Feature Flags element of the external service menu bar 410. User interface 900 is also rendered within the IT system 120, and includes details of applications that are available for download from the Application marketplace 170. In the illustrated embodiment, user interface 900 lists the following applications: LaunchDarkly for Jira, Rollout Feature Flags and Optimizely for Jira. These applications can be characterised as integration tools that allow the user to connect feature flag information to the IT system 120 (in this case Jira Software).

External service menu bar 410 is displayed in user interface 800 with the Feature Flags element underlined (or otherwise highlighted).

In the user interfaces illustrated in FIGS. 7, 8 and 9, each application is listed in association with an icon. The icons are illustrated schematically in FIGS. 7, 8 and 9 by simple geometric shapes, however in practice could take the form of any graphical indicia. The icons include in-built links (such as hyperlinks) to the application's location in the marketplace server 172. This allows the user to click (or enter user input by other means) on a selected icon, whereupon the IT system retrieves the application's entry from the marketplace server 172 and displays it on the user device 110.

Preferably, the external services listed in the user interfaces illustrated in FIGS. 7 to 9 are those that exchange data with IT system 120 through a controlled channel such as a public API that the IT system 120 provides.

Figure 10:
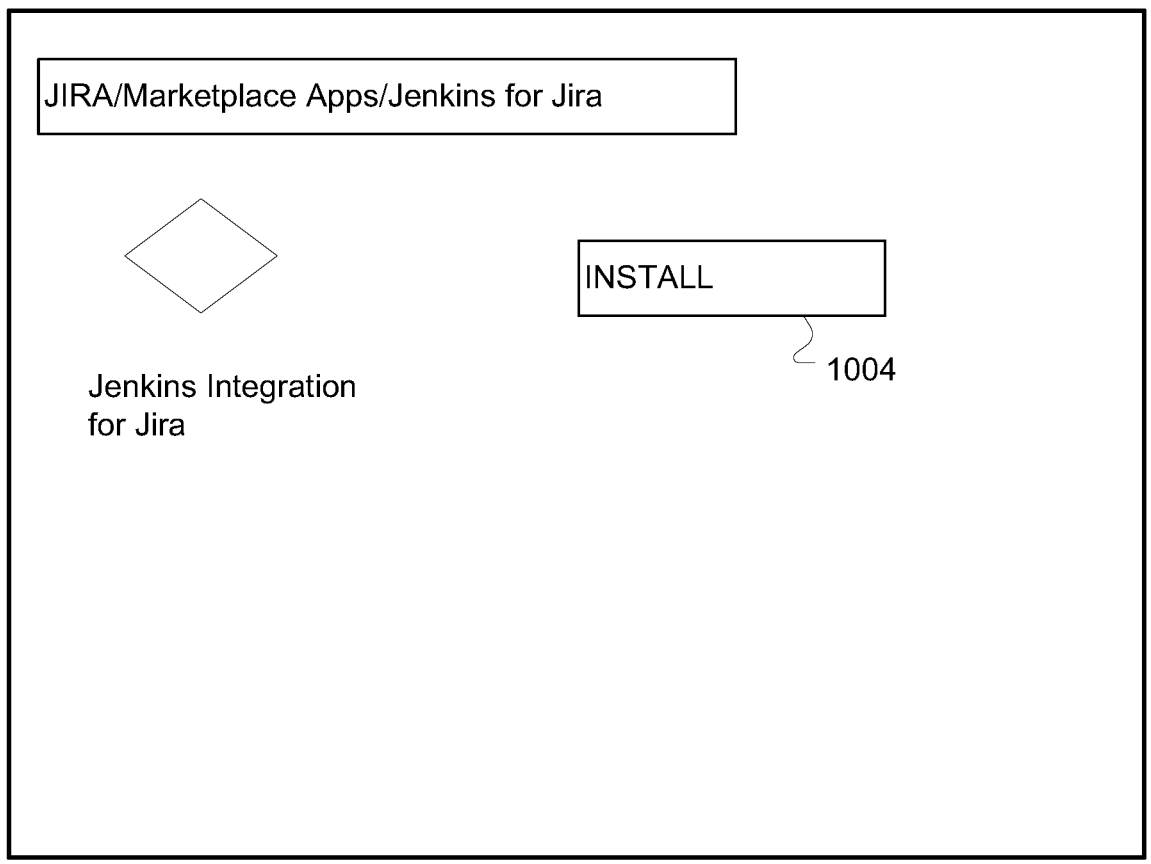
FIG. 10 is an example Application Marketplace user interface.

FIG. 10 schematically illustrates the marketplace entry 1002 that is displayed when the user clicks on the "Jenkins for Jira" icon in the user interface of FIG. 6. Marketplace entry 1002 includes an installation button 1004 that the user activates to download the application from the Application marketplace 170 and install it on the user device 110.

Figure 11:
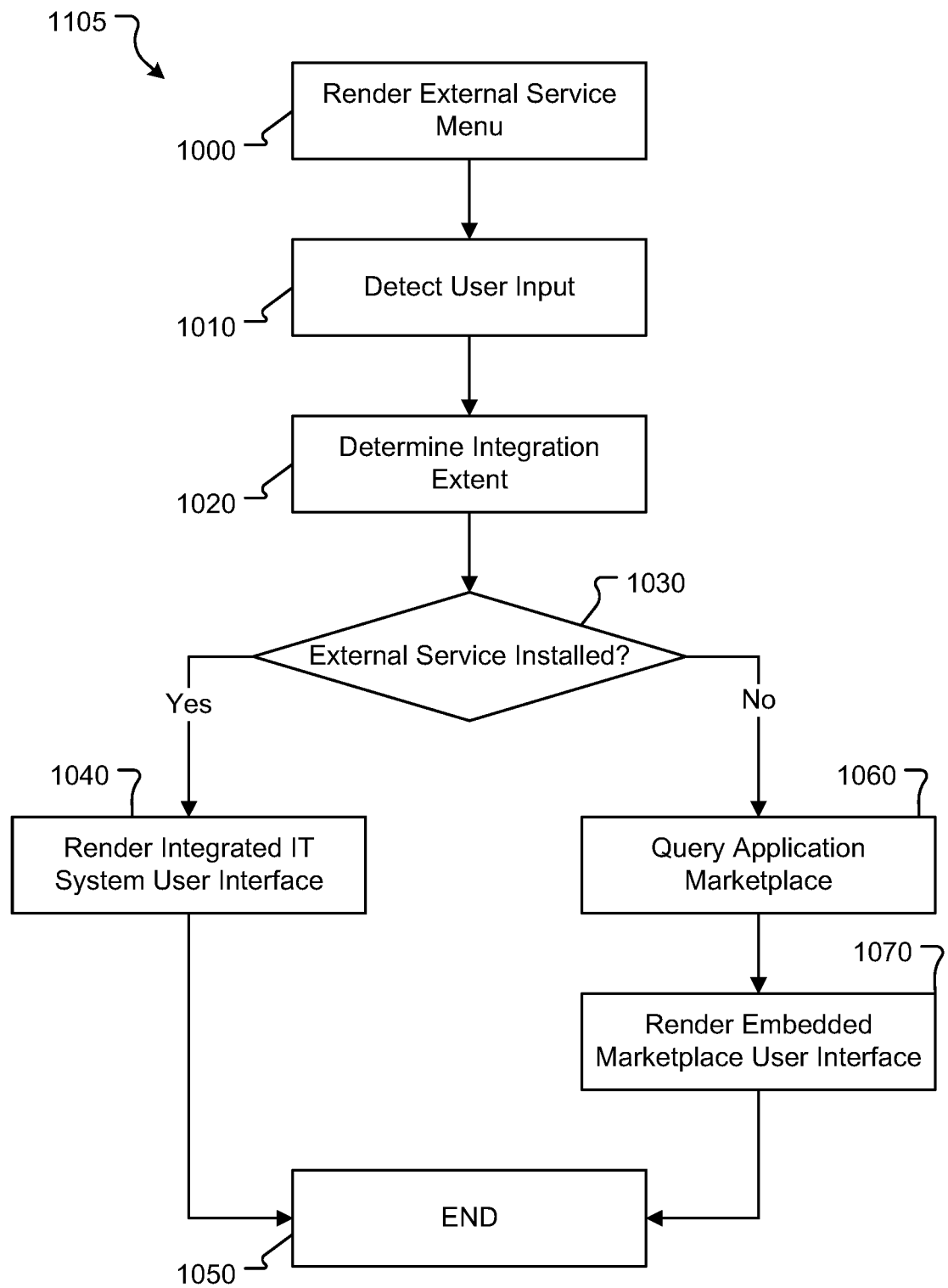
FIG. 11 is a flowchart indicating operations performed by the IT system to render the user interfaces illustrated in FIGS. 4 to 9.

FIG. 11 is a flowchart indicating operations 1105 performed by the IT system 120 to determine the extent of integration of the IT system with external services and present the user with a list of integration tools filtered by reference to the extent of integration.

The process commences at step 1000 with the IT system 120 rendering the external service menu bar 410 in the user interface of the IT system 120 in the manner described above.

At step 1110, the IT system 120 detects user input with an element of the external service menu bar 410. As described above, the user input can involve the user clicking on one of the elements of the external service menu bar (namely the Branches element, Commit element, Pull Request element, Builds element, Deployments element or Feature Flags element).

At step 1020, the IT system 120 determines the extent of integration between the IT system 120 and external services.

At step 1030, IT system 120 determines whether the user has installed an external service that relates to the element of the external service menu bar that the user selects. For example, as noted above, when the user selects the Builds element, IT system 120 determines whether software is installed that allows the user to connect build information maintained by an external service provider to the IT system 120. As noted above, examples of such software include Bitbucket Pipleines for Jira, Jenkins Integration for Jira, TeamCity Integration for Jira, Circle CI for Jira, Travis Integration for Jira and Jenkins for Jira (Official).

Likewise, when the user selects the Deployments element or Feature Flags element, IT system 120 determines whether software is installed that allows the user to connect deployment information or feature flag information maintained by a respective external service provider, to the IT system 120.

In the event that IT system 120 determines that the user has installed an applicable external service, the method proceeds to step 1040, at which the IT system 120 renders the appropriate user interface that details the information that has been or can be received into the IT system 120 from the external service provider. User interfaces 400, 500 and 600 are examples of such user interfaces, respectively detailing branch and commit information that has been received into IT system 120 and pull request information that potentially can be received into the IT system 120.

The process terminates (step 1050) after rendering the user interface at step 1040.

In the event that IT system 120 determines that the user has not installed an applicable external service, the method proceeds to step 1060. At step 1060, the IT system 120 determines which tools are available from the Application Marketplace 170 to connect the IT system 120 to an external service provider related to the element of the external service menu bar that the user selected in step 1110.

For example, when the user selects the Feature Flag element, IT system 120 determines which tools are available for download from the Application Marketplace 170 that allow the user to connect feature flag information to the IT system 120. In the illustrated embodiment, these tools are LaunchDarky for Jira, Rollout Feature Flags and Optimizely for Jira.

IT system 120 makes the determination of step 1060 by formulating a search query that incorporates the user input obtained in step 1110 and submitting the query to the Marketplace server 172 (typically over communication network 102). For example, when the user selects the Deployments element of the external service menu bar 410, IT client 112 constructs a URL that incorporates the domain name of the Marketplace server 172 and a query for integration applications relevant to deployment services. In the case of the Atlassian Marketplace, a suitable search query is: "marketingLabel=Jira-Deployments". However, those skilled in the art will appreciate that the query will be constructed by reference to the structure of the particular Application Marketplace 170.

At step 1070, IT system 120 renders in IT client 112 of user device 110, an embedded marketplace user interface that incorporates the results of the determination made in step 1060. In particular, the IT system 120 renders a user interface in which aspects of the application marketplace (namely search results) are embedded therein. In some embodiments, the embedded marketplace user interface is communicated to the IT client 112 in the form of an inline frame that the IT client displays on user device 110. The information in the embedded marketplace user interface (namely the listing of applications that are available from the Application Marketplace 170 to connect the IT system 120 to a relevant external service provider) is automatically generated for the user by the IT system 120. In other words, the user is not required to search the Application Marketplace themselves.

User interfaces 700, 800 and 900 are examples of embedded marketplace user interfaces. For example, user interface 700 includes a listing of applications available for download from the Application Marketplace 170 that, once installed, allow the user to connect build information hosted at an external service provider to the IT system 120. The list of applications (in this example Bitbucket Piplenies for Jira, Jenkins Integration for Jira, TeamCity Integration for Jira, Circle CI for Jira, Travis Integration for Jira and Jenkins for Jira (Official)) is automatically generated for the user in response to the user selecting the Builds element of the external service menu bar 410.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method comprising:
    rendering, by an issue tracking system (ITS), a user interface associated with an issue maintained by the ITS and including a plurality of user interface elements each representing a service provided by one or more external service providers, wherein the one or more external service providers store external objects representing aspects of a software development project;
    in response to a user selection of a user interface element of the plurality of user interface elements, determining, by the ITS, whether the issue is associated with an external object of a particular external service provider of the one or more external service providers, the particular external service provider configured to provide the service associated with the selected user interface element; and
    in accordance with a determination that the issue is not associated with the external object of the particular external service provider of the one or more external service providers, rendering, within the ITS, an application marketplace user interface, the application marketplace user interface including a listing of one or more integration applications that can be incorporated with the ITS, wherein:
        each integration application is associated with a respective external service provider; and
        subsequent to incorporation with the ITS, a respective integration application connects the ITS to the respective external service provider to allow the issue to be associated with an external object of the respective external service provider.

2. The computer-implemented method according to claim 1, wherein the ITS generates the listing of one or more integration applications by submitting a query to an application marketplace.

3. The computer-implemented method according to claim 2, wherein the query incorporates data from the selection of the user interface element.

4. The computer-implemented method according to claim 1, wherein the ITS determines whether the issue maintained by the ITS is associated with the external object of the particular external service provider by determining whether the ITS has received data from the particular external service provider.

5. The computer-implemented method according to claim 4, wherein the ITS determines whether the issue is associated with the external object of the particular external service provider by way of a public API.

6. The computer-implemented method according to claim 1, wherein the one or more external service providers are selected from the group consisting of:
   a source code management system;
   a build system;
   a deployment system;
   an automation system;
   an integration system; and
   a feature flag system.

7. The computer-implemented method according to claim 1, wherein the plurality of user interface elements include a branch user interface element, a commit user interface element, and a pull request user interface element.

8. The computer-implemented method according to claim 1, wherein the application marketplace user interface is an inline frame embedded in a document that the ITS renders.

9. The computer-implemented method according to claim 1, further comprising, in accordance with a determination that the issue is associated with the external object of the particular external service provider of the one or more external service providers, displaying information about the external object.

10. An issue tracking system (ITS) comprising:
   one or more processors; and
   one or more non-transitory computer-readable storage media storing sequences of instructions which, when executed by the one or more processors, cause the one or more processors to:
      render a user interface associated with an issue maintained by the ITS and including a plurality of user interface elements each representing a service provided by one or more external service providers, wherein the one or more external service providers store external objects representing aspects of a software development project;
      in response to a user selection of a user interface element of the plurality of user interface elements, determine whether the issue is associated with an external object of a particular external service provider of the one or more external service providers, the particular external service provider configured to provide the service associated with the selected user interface element; and
      in accordance with a determination that the issue is not associated with the external object of the particular external service provider of the one or more external service providers, render, within the ITS, an application marketplace user interface, the application marketplace user interface including a listing of one or more integration applications that can be incorporated with the ITS, wherein:
         each integration application is associated with a respective external service provider; and
         subsequent to incorporation with the ITS, a respective integration application connects the ITS to the respective external service provider to allow the issue to be associated with an external object of the respective external service provider.

11. The issue tracking system according to claim 10, wherein the one or more processors generate the listing of one or more integration applications by submitting a query to an application marketplace.

12. The issue tracking system according to claim 11, wherein the query incorporates data from the selection of the user interface element.

13. The issue tracking system according to claim 10, wherein the one or more processors determine whether the issue maintained by the ITS is associated with the external object of the particular external service provider by determining whether the ITS has received data from the particular external service provider.

14. The issue tracking system according to claim 13, wherein the one or more processors determines whether the issue is associated with the external object of the particular external service provider by way of a public API.

15. The issue tracking system according to claim 10, wherein the one or more external service providers are selected from the group consisting of:
   a source code management system;
   a build system;
   a deployment system;
   an automation system;
   an integration system; and
   a feature flag system.

16. The issue tracking system according to claim 10, wherein the listed plurality of user interface elements include a branch user interface element, a commit user interface element, and a pull request user interface element.

17. The issue tracking system according to claim 10, wherein the application marketplace user interface is an inline frame embedded in a document that the ITS renders.

18. The issue tracking system according to claim 10, wherein the sequences of instructions further include instructions which, when executed by the one or more processors, cause the one or more processors to, in accordance with a determination that the issue is associated with the external object of the particular external service provider of the one or more external service providers, display information about the external object.

* * * * *